(12) United States Patent
Yoder

(10) Patent No.: US 11,616,268 B2
(45) Date of Patent: Mar. 28, 2023

(54) ADAPTER FOR BATTERY COMPARTMENT

(71) Applicant: 3M INNOVATIVE PROPERTIES COMPANY, St. Paul, MN (US)

(72) Inventor: Mark A. Yoder, Zionsville, IN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 17/596,237

(22) PCT Filed: Jun. 3, 2020

(86) PCT No.: PCT/IB2020/055228
§ 371 (c)(1),
(2) Date: Dec. 6, 2021

(87) PCT Pub. No.: WO2020/250087
PCT Pub. Date: Dec. 17, 2020

(65) Prior Publication Data
US 2022/0271385 A1    Aug. 25, 2022

Related U.S. Application Data

(60) Provisional application No. 62/859,272, filed on Jun. 10, 2019.

(51) Int. Cl.
*H01M 50/267* (2021.01)
*H01M 50/247* (2021.01)
(Continued)

(52) U.S. Cl.
CPC ....... *H01M 50/267* (2021.01); *H01M 50/247* (2021.01); *H01R 11/22* (2013.01);
(Continued)

(58) Field of Classification Search
CPC ............ H01M 50/267; H01M 50/247; H01M 2220/30; H01M 50/213; H01R 11/22;
(Continued)

(56) References Cited

U.S. PATENT DOCUMENTS

| 4,431,717 A | 2/1984 | Kikuchi |
| 4,737,420 A | 4/1988 | Ikeda |

(Continued)

FOREIGN PATENT DOCUMENTS

| CN | 104282859 | 1/2015 |
| CN | 104795523 | 7/2015 |

(Continued)

OTHER PUBLICATIONS

International Search Report for PCT International Application No. PCT/IB2020/055228, dated Jul. 16, 2020, 4 pages.

*Primary Examiner* — M Baye Diao
(74) *Attorney, Agent, or Firm* — Katherine M. Scholz

(57) ABSTRACT

An adapter for use with a battery compartment of an electronic device is provided. The adapter includes a first section adapted to receive a first portion of at least one first battery. The adapter also includes a second section disposed adjacent to the first section. The second section is adapted to receive a second portion of the at least one first battery. The adapter further includes an articulating joint disposed between the first section and the second section. The articulating joint is adapted to selectively articulate the first section relative to the second section to move the adapter between a first position and a second position. In the first position, the adapter is adapted to be aligned in the battery compartment. In the second position, the adapter is adapted to be removably secured in the battery compartment.

20 Claims, 10 Drawing Sheets

(51) Int. Cl.
  *H01R 11/22* (2006.01)
  *H01R 13/62* (2006.01)
  *H02J 7/00* (2006.01)
(52) U.S. Cl.
  CPC ......... *H01R 13/62* (2013.01); *H01M 2220/30* (2013.01); *H02J 7/0013* (2013.01); *H02J 7/0063* (2013.01)
(58) Field of Classification Search
  CPC ...... H01R 13/62; H02J 7/0013; H02J 7/0063; Y02E 60/10
  USPC .......................................................... 429/99
  See application file for complete search history.

(56) References Cited

U.S. PATENT DOCUMENTS

| | | | | |
|---|---|---|---|---|
| 5,945,235 | A * | 8/1999 | Clanton | H01M 50/213 429/100 |
| 6,071,639 | A * | 6/2000 | Bryant | H01M 50/271 429/97 |
| 6,225,777 | B1 * | 5/2001 | Garcia | H01M 50/213 320/112 |
| 6,806,681 | B1 * | 10/2004 | Cheiky | G03B 7/26 396/539 |
| 7,187,156 | B2 | 3/2007 | Nakasho | |
| 7,354,301 | B2 * | 4/2008 | Noguchi | H01M 50/597 439/500 |
| 7,678,500 | B2 | 3/2010 | Willey | |
| 7,884,573 | B1 | 2/2011 | Larsen | |
| 8,436,576 | B2 | 5/2013 | Toya | |
| 9,876,201 | B2 * | 1/2018 | Ishikawa | A01D 34/902 |
| 10,587,133 | B2 * | 3/2020 | Saihara | H05K 5/0017 |
| 11,424,491 | B2 * | 8/2022 | Väin | B60L 53/80 |
| 2007/0172724 | A1 | 7/2007 | Furth | |
| 2008/0084214 | A1 * | 4/2008 | Hoffman | H01M 50/267 324/426 |
| 2017/0331082 | A1 * | 11/2017 | Kawamata | H01M 50/296 |
| 2022/0209479 | A1 * | 6/2022 | Mizrahi | H04B 1/3883 |

FOREIGN PATENT DOCUMENTS

| | | | | |
|---|---|---|---|---|
| DE | 19646047 | 5/1998 | | |
| EP | 1109237 | 6/2001 | | |
| EP | 3309863 | 4/2018 | | |
| JP | 57208060 | 12/1982 | | |
| JP | 63310576 | 12/1988 | | |
| JP | 3024386 | 5/1996 | | |
| JP | 09180693 | 7/1997 | | |
| JP | 09237618 | 9/1997 | | |
| JP | 10003894 | 1/1998 | | |
| JP | 2001229894 | 8/2001 | | |
| JP | 2001229894 A * | 8/2001 | | Y02E 60/10 |
| JP | 2003187769 | 7/2003 | | |
| JP | 2005116237 | 4/2005 | | |
| JP | 2005235650 | 9/2005 | | |
| JP | 2007324032 | 12/2007 | | |
| JP | 2018056003 | 4/2018 | | |
| WO | WO 2012-101557 | 8/2012 | | |

* cited by examiner

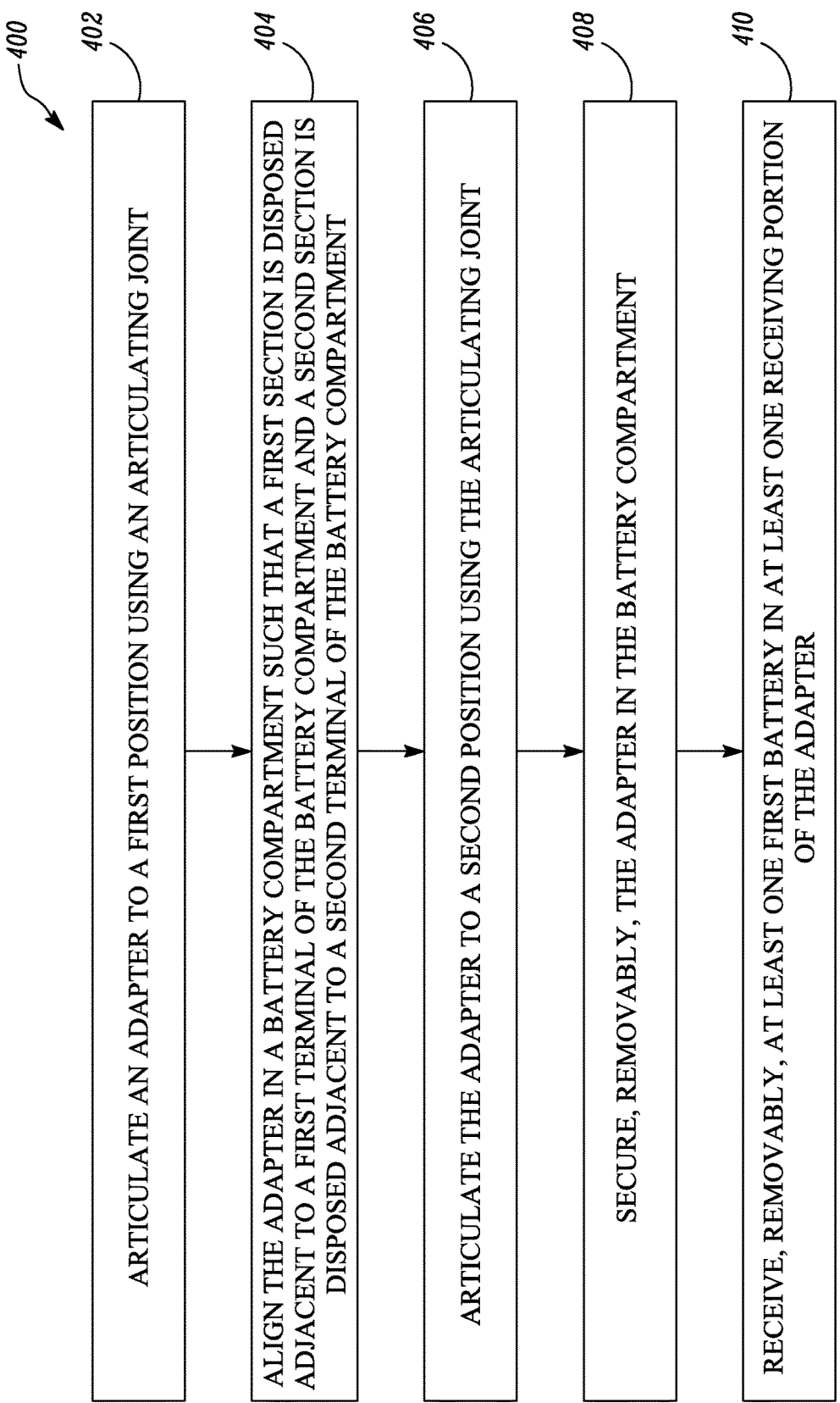

ADAPTER FOR BATTERY COMPARTMENT

CROSS REFERENCE TO RELATED APPLICATIONS

This application is a national stage filing under 35 U.S.C. 371 of PCT/IB2020/055228, filed Jun. 3, 2020, which claims the benefit of U.S. Application No. 62/859,272, filed Jun. 10, 2019, the disclosure of which is incorporated by reference in its/their entirety herein.

TECHNICAL FIELD

The present disclosure relates generally to an adapter for use with a battery compartment of an electronic device.

BACKGROUND

Battery powered electronic devices are typically designed to receive and be powered by a single size of batteries, such as AA-size batteries. In situations where such AA-size batteries may be unavailable, the electronic device may not be able to receive and be powered by other available batteries having a different size, such as AAA-size batteries. As such, in such a situation, the electronic device may be rendered unusable due to non-availability of batteries of an appropriate size. Further, in some applications, such as travel or portable applications, it may be preferable to carry batteries having a relatively smaller size, such as AAA-size, compared to AA-size batteries in order to reduce an overall bulk and weight of the batteries. Hence, there is a need for an apparatus for powering such electronic devices with differently sized batteries.

SUMMARY

In one aspect, an adapter for use with a battery compartment of an electronic device is provided. The adapter includes a first section adapted to receive a first portion of at least one first battery. The adapter also includes a second section disposed adjacent to the first section. The second section is adapted to receive a second portion of the at least one first battery. The adapter further includes an articulating joint disposed between the first section and the second section. The articulating joint is adapted to selectively articulate the first section relative to the second section to move the adapter between a first position and a second position. In the first position, the adapter is adapted to be aligned in the battery compartment. In the second position, the adapter is adapted to be removably secured in the battery compartment.

In another aspect, an electronic device selectively powered by one of at least one first battery and at least one second battery is provided. The electronic device includes a battery compartment adapted to selectively receive the at least one second battery. The electronic device also includes an adapter adapted to be removably received in the battery compartment. The adapter is adapted to selectively receive the at least one first battery. The adapter includes a first section adapted to receive a first portion of the at least one first battery. The adapter also includes a second section disposed adjacent to the first section. The second section is adapted to receive a second portion of the at least one first battery. The adapter further includes an articulating joint disposed between the first section and the second section. The articulating joint is adapted to selectively articulate the first section relative to the second section to move the adapter between a first position and a second position. In the first position, the adapter is adapted to be aligned in the battery compartment. In the second position, the adapter is adapted to be removably secured in the battery compartment.

In yet another aspect, a method of using an adapter with a battery compartment of an electronic device is provided. The method includes articulating the adapter to a first position using an articulating joint. The method includes aligning the adapter in the battery compartment such that a first section is disposed adjacent to a first terminal of the battery compartment and a second section is disposed adjacent to a second terminal of the battery compartment. The method includes articulating the adapter to the second position using the articulating joint. The method also includes removably securing the adapter in the battery compartment. The method further includes removably receiving at least one first battery in at least one receiving portion of the adapter.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIG. 4 is a flowchart of a method of assembling the adapter of FIG. 2 in the battery compartment of FIG. 3B, according to one embodiment of the present disclosure.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

Figure 1:
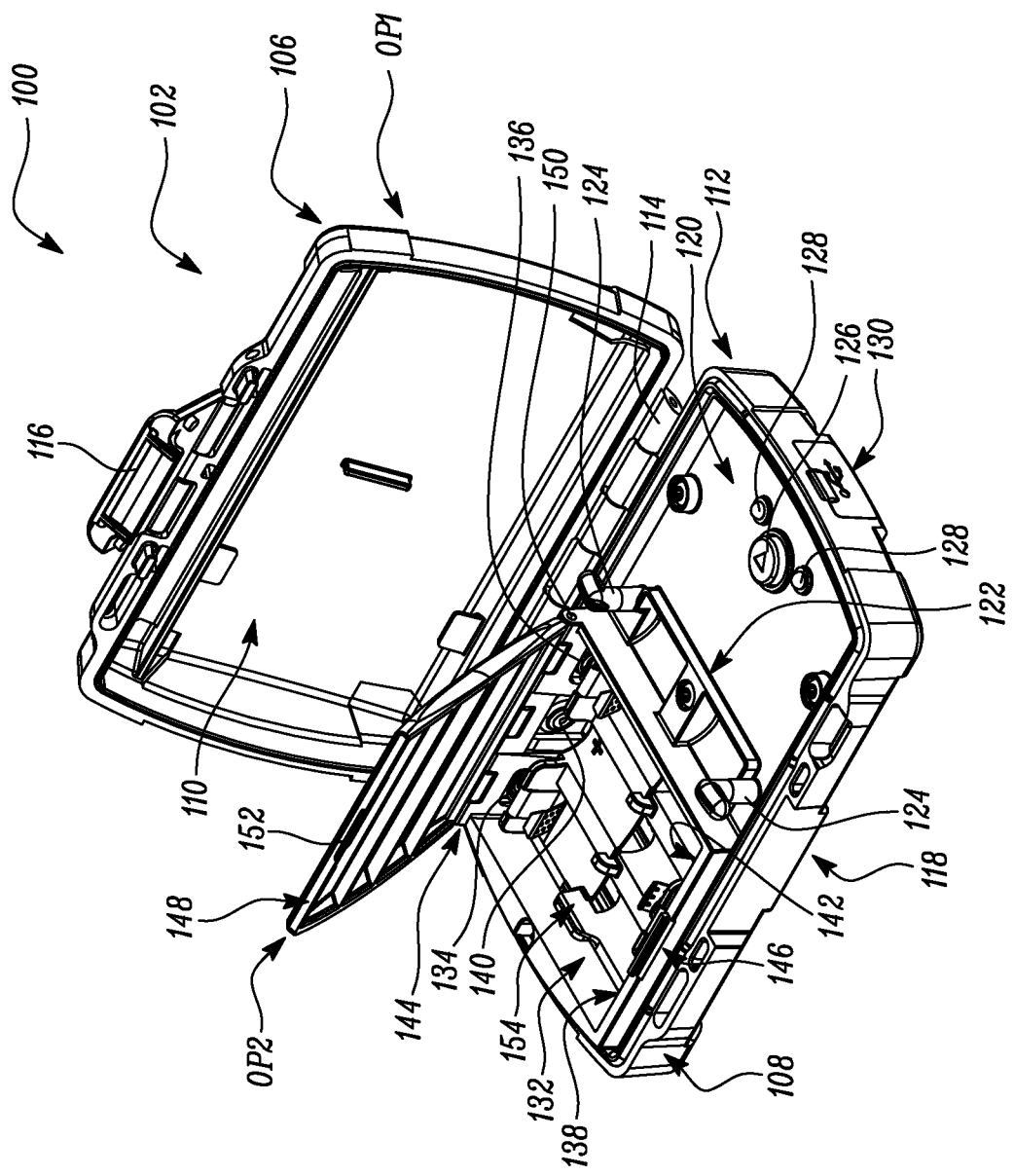
FIG. 1 is a perspective view of an exemplary electronic device, according to one embodiment of the present disclosure.

Referring to FIG. 1, a perspective view of an exemplary electronic device 100 is illustrated. More specifically, in the illustrated embodiment, the electronic device 100 is a portable charging device 102. The portable charging device 102 will be hereinafter interchangeably referred to as the "device 102". In the illustrated embodiment, the device 102 is adapted to charge another battery powered device (not shown), such as chargeable earplugs. In other embodiments, the battery powered device may be any other chargeable device, such as earphones, microphones, hearing aids, fitness bands, tactical communication devices, and so on. The device 102 is adapted to be selectively powered by at least one first battery 302, 304, 306 (shown in FIG. 3F), such as one or more AAA-size batteries, or at least one second battery 332, 334, 336 (shown in FIG. 3A), such as one or more AA-size batteries, in order to charge the battery powered device. In other embodiments, the electronic device 102 may be any other battery powered electronic device, such as a remote control device, a speaker, a clock, a computer mouse, a computer keyboard, a camera, a health monitoring device, a navigation device, a hand-held communication device, and so on.

The device 102 includes a housing 106. The housing 106 is adapted to enclose one or more components of the device 102. In the illustrated embodiment, the housing 106 has a substantially rectangular configuration. In other embodiments, the housing 106 may have any other configuration, such as elliptical, circular, and so on, based on application requirements. The housing 106 includes a base portion 108 and a cover portion 110. The cover portion 110 is movably coupled to an end 112 of the base portion 108 via a hinge joint 114. As such, the cover portion 110 is adapted to move between an open position "OP1" (shown in the accompanying figure) and a closed position (not shown) relative to the base portion 108 about the hinge joint 114. Accordingly, in the open position "OP1", the cover portion 110 provides access into the housing 106. Also, in the closed position, the cover portion 110 restricts access into the housing 106. The housing 106 also includes a latch 116 disposed on the cover portion 110. In the closed position of the cover portion 110, the latch 116 is adapted to engage with an end 118 of the base portion 108 in order to releasably lock the cover portion 110 relative to the base portion 108.

The base portion 108 is adapted to receive one or more components of the device 102. The base portion 108 includes a storage section 120. The storage section 120 includes a receiving section 122. The receiving section 122 is adapted to receive the battery powered device, such as a pair of chargeable earplugs (not shown) in order to charge and/or store the pair of chargeable earplugs within the device 102. As such, the receiving section 122 may include one or more connection terminals (not shown). The connection terminals may be adapted to electrically connect with the pair of chargeable earplugs in order to charge the pair of chargeable earplugs. The storage section 120 also includes a pair of protrusions 124 extending from the storage section 120. The pair of protrusions 124 is adapted to wind and stow one or more wires (not shown), a tether cable (not shown), a tether band (not shown), a lanyard (not shown), a strap (not shown), and so on therearound, in the storage section 120.

The storage section 120 also includes one more controls of the device 102. In the illustrated embodiment, the controls include a switch 126 and a number of Light Emitting Diode (LED) indicators 128. The switch 126 is adapted to switch the device 102 between an on position and an off position. The on position may refer to an active charging status of the battery powered device by the device 102. The off position may refer to an inactive charging status of the battery powered device by the device 102. The LED indicators 128 are adapted to visibly indicate the charging status and/or other operational status of the device 102. The base portion 108 also includes a power port 130. The power port 130 is adapted to alternatively provide power supply to the device 102 from an external power source (not shown). As such, the device 102 may be used to alternatively charge the battery powered device using power supply from the external power source via the power port 130.

The device 102 also includes a battery compartment 132. The battery compartment 132 is disposed in the base portion 108 of the housing 106 and adjacent to the storage section 120. The battery compartment 132 is adapted to selectively receive the at least one second battery 332, 334, 336, such as the one or more AA-size batteries. In the illustrated embodiment, the battery compartment 132 is adapted to receive three second batteries 332, 334, 336. In other embodiments, the battery compartment 132 may be adapted to receive single or multiple second batteries, based on application requirements. The second batteries 332, 334, 336 are adapted to power the device 102 and charge the battery powered device, such as the pair of chargeable earplugs, received in the receiving section 122 of the storage section 120.

The battery compartment 132 also includes a number of first terminals 134, 308, 136 (shown in FIGS. 1 and 3B) and a number of second terminals 138, 140, 142. More specifically, the battery compartment 132 includes three first terminals 134, 308, 136 and three second terminals 138, 140, 142, based on number of the second batteries 332, 334, 336. Each of the first terminals 134, 308, 136 refers to a negative terminal of the device 102. Also, each of the first terminals 134, 308, 136 is a spring type terminal of the battery compartment 132. In other embodiments, one or more of the first terminals 134, 308, 136 may have any other configuration, such as a resilient plate type configuration, and so on, based on application requirements. Each of the second terminals 138, 140, 142 refers to a positive terminal of the device 102. Also, each of the second terminals 138, 140, 142 is a flat coil type terminal of the battery compartment 132. In other embodiments, one or more of the second terminals 138, 140, 142 may have any other configuration, such as a plate type configuration, a tab type configuration, and so on, based on application requirements.

Each of the first terminals 134, 308, 136 and each of the second terminals 138, 140, 142 are adapted to be electrically connected to a corresponding second battery 332, 334, 336 in order to complete an electrical circuit and provide power supply to charge the battery powered device. In the illustrated embodiment, each of the first terminals 134, 308, 136 and each of the second terminals 138, 140, 142 are disposed in an alternating sequence on opposing ends 144, 146 of the battery compartment 132. For example, each of the first terminal 134, the second terminal 140, and the first terminal 136 is disposed on the end 144 of the battery compartment 132. Also, each of the second terminal 138, the first terminal 308, and the second terminal 142 is disposed on the end 146 of the battery compartment 132. In other embodiments, one or more of the first terminals 134, 308, 136 and/or the second terminals 138, 140, 142 may be disposed in any arrangement within the battery compartment 132, based on application requirements.

The battery compartment 132 also includes a lid portion 148. The lid portion 148 is movably coupled to the end 144 of the battery compartment 132. As such, the lid portion 148 is adapted to move between an open position "OP2" (shown in the accompanying figure) and a closed position (not shown) relative to the battery compartment 132 about a hinge joint 150. Accordingly, in the open position "OP2", the lid portion 148 provides access into the battery compartment 132. Also, in the closed position, the lid portion 148 restricts access into the battery compartment 132. The battery compartment 132 also includes a latch 152 disposed on the lid portion 148. In the closed position of the lid portion 148, the latch 152 is adapted to engage with the end 146 of the battery compartment 132 in order to releasably lock the lid portion 148 relative to the battery compartment 132.

The device 102 also includes an adapter 154. The adapter 154 is adapted for use with the battery compartment 132 of the device 102. As such, the adapter 154 is adapted to be removably received in the battery compartment 132. More specifically, the adapter 154 is adapted to selectively receive the at least one first battery 302, 304, 306. The at least one first battery 302, 304, 306 has a length "L1" (shown in FIG. 3F) substantially smaller than a length "L2" (shown in FIG. 3A) of the at least one second battery 332, 334, 336. For example, in the illustrated embodiment, the battery compartment 132 is adapted to receive one or more AA-size batteries, whereas, the adapter 154 is adapted to receive one or more AAA-size batteries having the length "L1" smaller than the length "L2" of the one or more AA-size batteries. The adapter 154 is adapted to receive a plurality of first batteries 302, 304, 306. More specifically, in the illustrated embodiment, the adapter 154 is adapted to receive three first batteries 302, 304, 306. In other embodiments, the adapter 154 may be adapted to receive single or multiple first batteries, based on application requirements.

Figure 2:
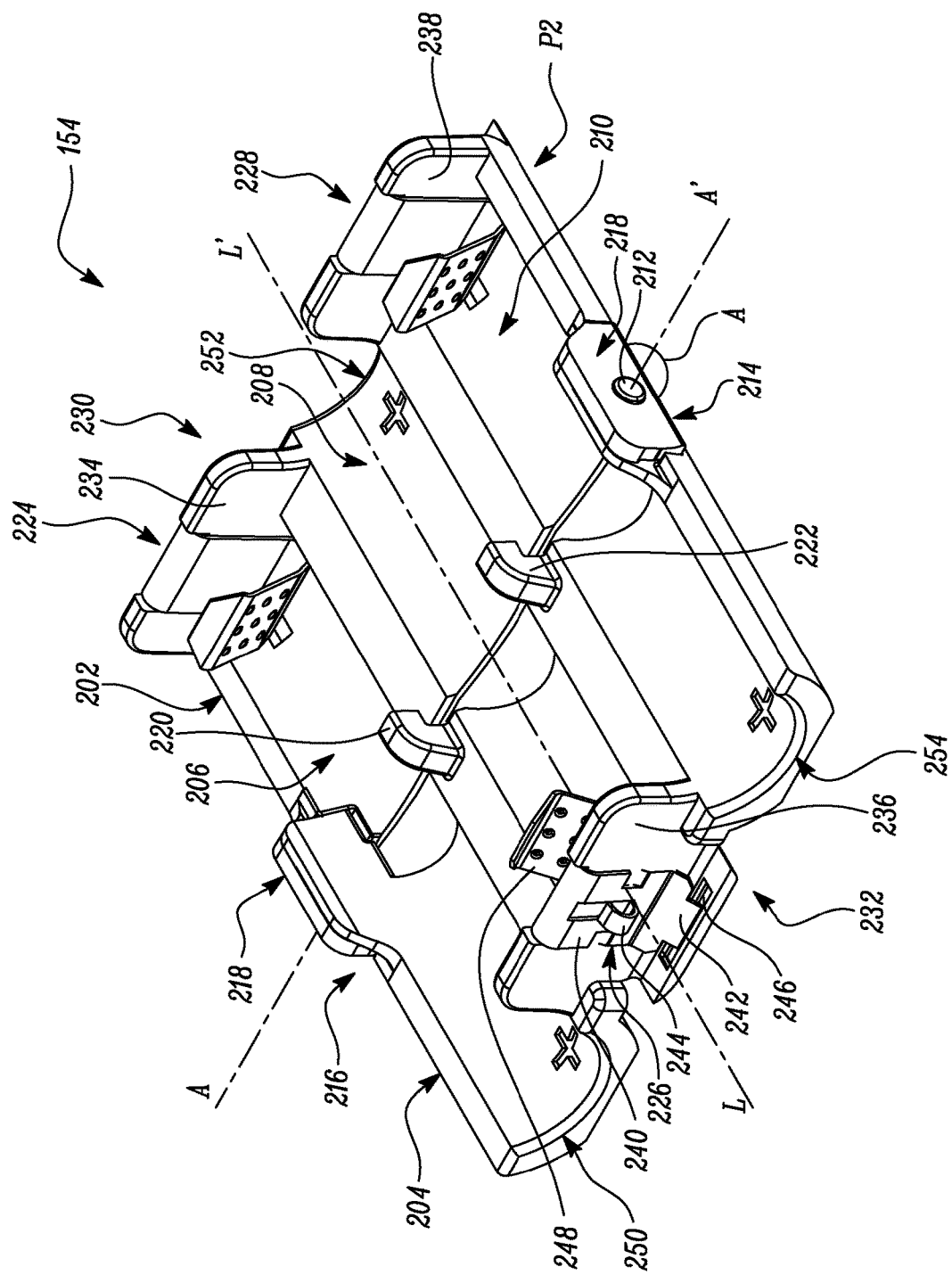
FIG. 2 is a perspective view of an adapter for the electronic device of FIG. 1, according to one embodiment of the present disclosure.

Referring to FIG. 2, a perspective view of the adapter 154 is illustrated. The adapter 154 includes a first section 202 and a second section 204. The second section 204 is disposed adjacent to the first section 202. The first section 202 is adapted to receive a first portion 310, 314 (shown in FIG. 3F) of the at least one first battery 302, 306, respectively, and a second portion 318 (shown in FIG. 3F) of the first battery 304. Also, the second section 204 is adapted to receive a second portion 316, 320 (shown in FIG. 3F) of the at least one first battery 302, 306, respectively, and a first portion 312 (shown in FIG. 3F) of the first battery 304. Further, the adapter 154 includes at least one receiving portion. The at least one receiving portion extends between the first section 202 and the second section 204. The at least one receiving portion is adapted to removably receive the at least one first battery 302, 304, 306, respectively.

More specifically, in the illustrated embodiment, the adapter 154 includes a plurality of receiving portions, such as a first receiving portion 206, a second receiving portion 208, and a third receiving portion 210. In other embodiments, the adapter 154 may include single or multiple receiving portions, based on application requirements. Each of the first receiving portion 206, the second receiving portion 208, and the third receiving portion 210 extends between the first section 202 and the second section 204. Also, each of the first receiving portion 206, the second receiving portion 208, and the third receiving portion 210 is disposed adjacent to one another. Each of the first receiving portion 206, the second receiving portion 208, and the third receiving portion 210 is adapted to removably receive a corresponding first battery 302, 304, 306 from the plurality of first batteries 302, 304, 306, respectively.

For example, the first receiving portion 206 is adapted to removably receive the first battery 302. The second receiving portion 208 is adapted to removably receive the first battery 304. The third receiving portion 210 is adapted to removably receive the first battery 306. In the illustrated embodiment, the plurality of first batteries 302, 304, 306 are adapted to be disposed in an alternating sequence within the adapter 154, such that each of the first battery 302 and the first battery 306 is aligned in a direction "D1" (shown in FIG. 3F) and the first battery 304 is aligned in a direction "D2" (shown in FIG. 3F). Further, the first battery 304 is longitudinally offset with respect to each of the first batteries 302, 306. Accordingly, the first section 202 of the adapter 154 receives the first portion 310, 314 of each of the first battery 302 and the first battery 306, respectively, and the second portion 318 of the first battery 304. Also, the second section 204 of the adapter 154 receives the second portion 316, 320 of each of the first battery 302 and the first battery 306, respectively, and the first portion 312 of the first battery 304. In other embodiments, the plurality of first batteries 302, 304, 306 may be disposed in any arrangement within the battery compartment 132, based on application requirements.

The adapter 154 also includes an articulating joint 212. The articulating joint 212 is disposed between the first section 202 and the second section 204 and defines an articulating axis A-A' (shown in FIG. 2). Also, the articulating joint 212 is disposed on each end 214, 216 of the adapter 154 (only one articulating joint 212 shown on the end 214 in the accompanying figures). In the illustrated embodiment, the articulating joint 212 is a pin joint. In other embodiments, the articulating joint 212 may be any other rotating joint, such as a hinge joint, a spring based rotating joint, a resilient rotating joint, and so on, based on application requirements. The articulating joint 212 is adapted to selectively articulate the first section 202 relative to the second section 204 to move the adapter 154 about the articulating axis A-A' between a first position "P1" (shown in FIGS. 3C and 3D), and a second position "P2" (shown in FIGS. 2, 3E, and 3F). As such, an angle "A" is defined between the first section 202 and the second section 204 about the articulating joint 212 and the articulating axis A-A'.

Figure 3A:
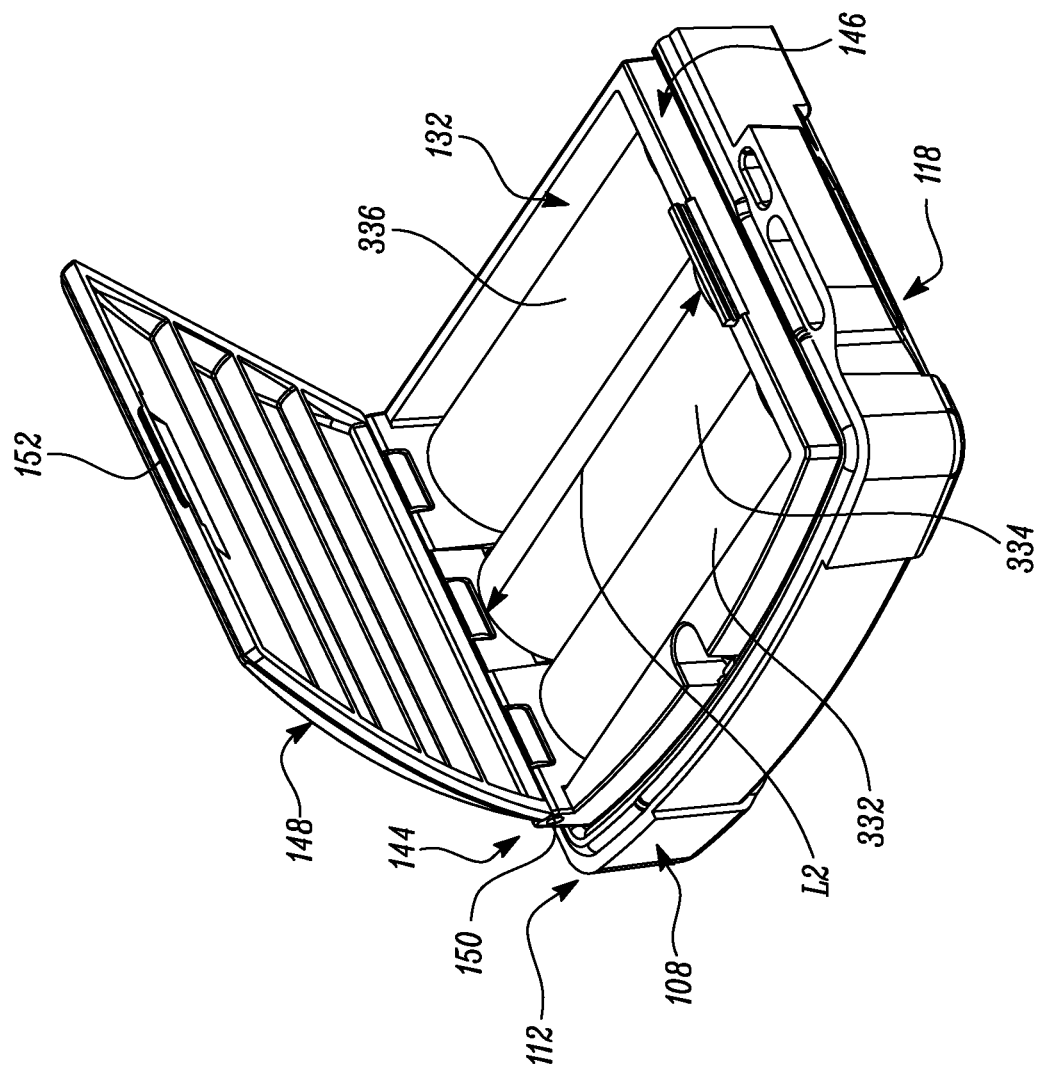
FIG. 3A is a perspective view showing a number of second batteries received in a battery compartment of the electronic device of FIG. 1, according to one embodiment of the present disclosure.
Figure 3B:
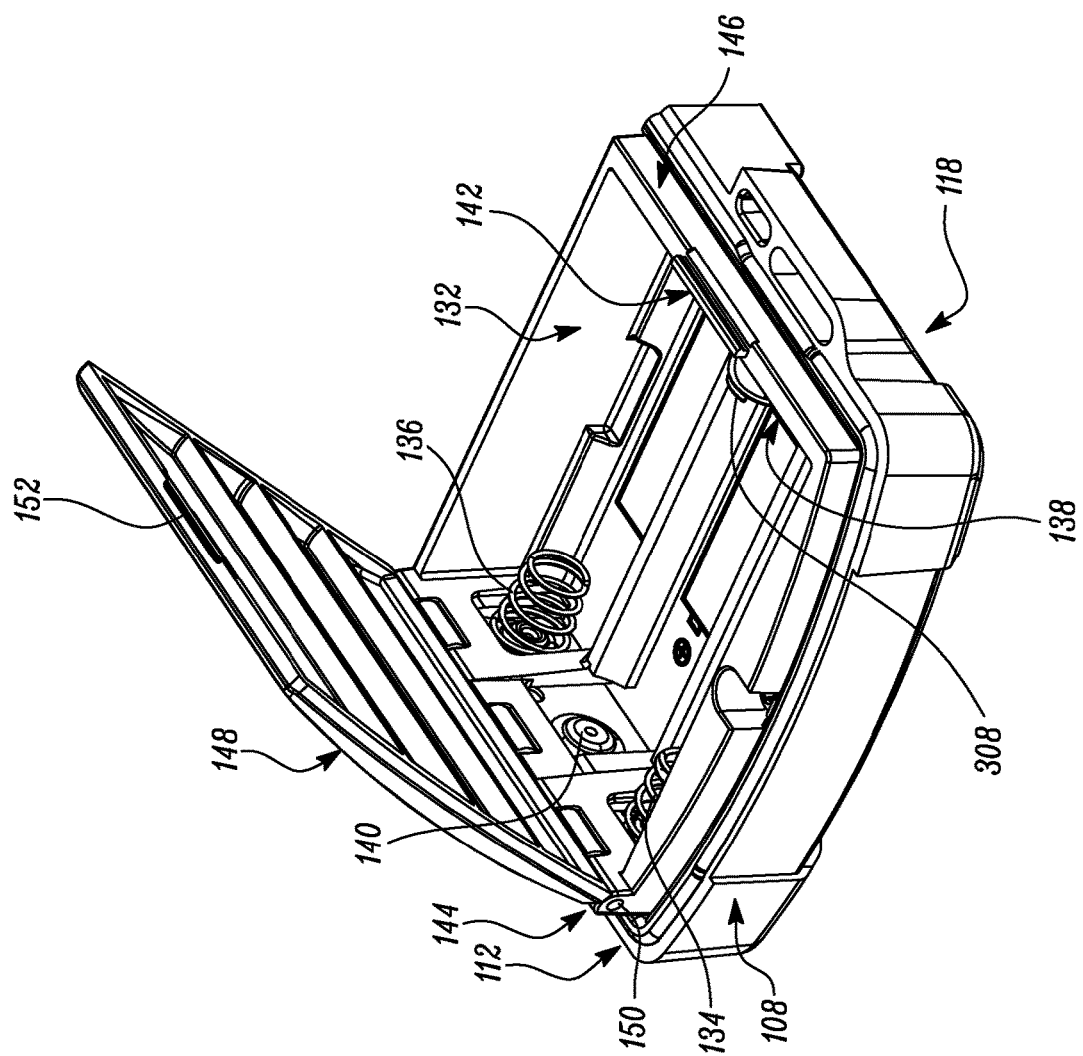
FIG. 3B is a perspective view of the battery compartment of FIG. 3A without the second batteries, according to one embodiment of the present disclosure.
Figure 3C:
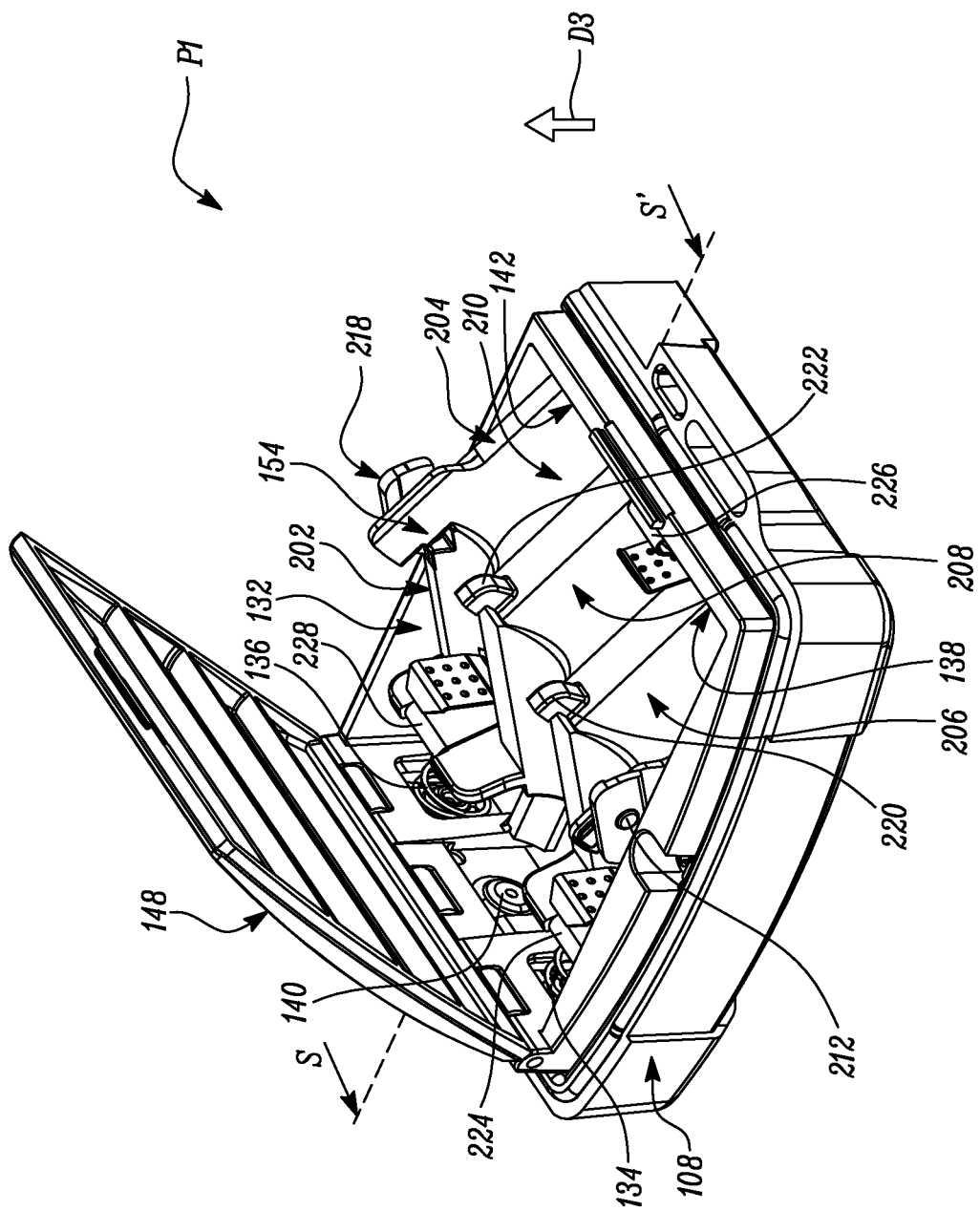
FIG. 3C is a perspective view showing the adapter of FIG. 2 aligned in the battery compartment of FIG. 3B, according to one embodiment of the present disclosure.

Referring to FIG. 3C, in the first position "P1", the first section 202 is inclined relative to the second section 204. In the illustrated embodiment, in the first position "P1", the angle "A" measures approximately 45 degrees (°). In other embodiments, the angle "A" may range from approximately 10° to approximately 45°. Accordingly, in the first position "P1", the adapter 154 is adapted to be aligned in the battery compartment 132. Specifically, the adapter 154 may be longitudinally aligned in the battery compartment 132. Referring to FIG. 2, in the second position "P2", the first section 202 is substantially parallel to the second section 204. More specifically, in the second position "P2", the first section 202 and the second section 204 are aligned along a longitudinal axis L-L' of the adapter 154. As such, in the second position "P2", the angle "A" between the first section 202 and the second section 204 measures approximately 180°. Accordingly, in the second position "P2", the adapter 154 is adapted to be removably secured in the battery compartment 132.

The adapter 154 also includes a locking member 218. The locking member 218 is disposed in association with each of the first section 202 and the second section 204. In the illustrated embodiment, the locking member 218 is disposed adjacent to the articulating joint 212 and on each end 214, 216 of the adapter 154. In other embodiments, locking member 218 may be disposed on any one end 214, 216 of the adapter 154. The locking member 218 is adapted to removably secure the adapter 154 in the second position "P2". Accordingly, the locking member 218 may be any locking arrangement, such as interlocking tabs, engaging surfaces, such as a combination of a recess and a corresponding protrusion, and so on, based on application requirements.

The adapter 154 also includes at least one holder portion. In the illustrated embodiment, the adapter 154 includes two holder portions, such as a first holder portion 220 and a second holder portion 222. In other embodiments, the adapter 154 may include single or multiple holder portions, based on application requirements. The first holder portion 220 is disposed between the first receiving portion 206 and the second receiving portion 208. The second holder portion 222 is disposed spaced apart from the first holder portion 220, and between the second receiving portion 208 and the third receiving portion 210.

In the illustrated embodiment, each of the first holder portion 220 and the second holder portion 222 is disposed on the second section 204 of the adapter 154. In the other embodiments, one or more of the first holder portion 220 and the second holder portion 222 may be disposed on the first section 202 of the adapter 154. In the illustrated embodiment, each of the first holder portion 220 and the second holder portion 222 has a substantially hook-shaped configuration. In other embodiments, one or more of the first holder portion 220 and the second holder portion 222 may have any other configuration, such as a loop shaped configuration, an eyelet shaped configuration, and so on, based on application requirements. Each of the first holder portion 220 and the second holder portion 222 is adapted to allow a user to hold or grip the adapter 154 during aligning, securing, and/or removing the adapter 154 relative to the battery compartment 132.

The adapter 154 also includes at least one adapter terminal. The at least one terminal is disposed on at least one of the first section 202 and the second section 204. More specifically, in the illustrated embodiment, the adapter 154 includes a plurality of adapter terminals, such as a first adapter terminal 224, a second adapter terminal 226, and a third adapter terminal 228. In the illustrated embodiment, the plurality of adapter terminals includes three adapter terminals. In other embodiments, the adapter 154 may include single or multiple adapter terminals, based on application requirements. In the illustrated embodiment, each of the plurality of adapter terminals is disposed on an end 230, 232 of at least one of the first section 202 and the second section 204, respectively, and in association with a corresponding receiving portion from the plurality of receiving portions. Also, each of the plurality of adapter terminals is disposed on an extension portion provided on the end 230, 232 of at least one of the first section 202 and the second section 204, respectively.

More specifically, the adapter 154 includes a number of extension portions, such as a first extension portion 234, a second extension portion 236, and a third extension portion 238. The first extension portion 234 is disposed on the end 230 of the first section 202 and in association with the first receiving portion 206. The first extension portion 234 is adapted to receive the first adapter terminal 224. The second extension portion 236 is disposed on the end 232 of the second section 204 and in association with the second receiving portion 208. The second extension portion 236 is adapted to receive the second adapter terminal 226. The third extension portion 238 is disposed on the end 230 of the first section 202 and in association with the third receiving portion 210. The third extension portion 238 is adapted to receive the third adapter terminal 228. Accordingly, the plurality of adapter terminals is disposed alternatively on the first section 202 and the second section 204 and in association with the corresponding receiving portion from the plurality of receiving portions.

The plurality of adapter terminals will now be explained further with reference to the second adapter terminal 226. The second adapter terminal 226 includes a retaining portion 240. The retaining portion 240 has a substantially inverted U-shaped configuration. In other embodiments, the retaining portion 240 may have any other configuration, such as a clamp shaped configuration, based on application requirements. The retaining portion 240 is adapted to be coupled to the second extension portion 236. The retaining portion 240 also includes a first protrusion 242 and a second protrusion 244. The first protrusion 242 is adapted to engage with a recess 246 provided adjacent to the second extension portion 236 and on the end 232 of the second section 204. As such, the engagement of the first protrusion 242 and the recess 246 retains the second adapter terminal 226 on the second extension portion 236. The second protrusion 244 is disposed adjacent to the first protrusion 242. In the illustrated embodiment, the second protrusion 244 has a hook-shaped configuration. In the second position "P2" of the adapter 154, the second protrusion 244 is adapted to engage with the first terminal 308 in order to retain the first terminal 308 in contact with the second adapter terminal 226.

The second adapter terminal 226 also includes a resilient portion 248. The resilient portion 248 extends away from the retaining portion 240 and further into the second receiving portion 208. In the illustrated embodiment, the resilient portion 248 has a substantially plate type configuration. In other embodiments, the resilient portion 248 may have any other resilient configuration, such as a spring type configuration, and so on, based on application requirements. The resilient portion 248 is adapted to contact and electrically connect to a negative terminal 326 of the first battery 304. It should be noted that although the adapter terminal of the adapter 154 is described with reference to the second adapter terminal 226, each of the first adapter terminal 224 and the third adapter terminal 228 includes a shape, design, configuration, and construction similar to that of the second adapter terminal 226.

In the second position "P2" of the adapter 154, each of the plurality of adapter terminals is adapted to be electrically connected to the first terminal 134, 308, 136 of the battery compartment 132, respectively. For example, in the second position "P2" of the adapter 154, a retaining portion (not shown) of the first adapter terminal 224 is adapted to contact and compress the first terminal 134 of the battery compartment 132 in order to electrically connect the first adapter terminal 224 to the first terminal 134. Also, in the second position "P2" of the adapter 154, the retaining portion 240 of the second adapter terminal 226 is adapted to contact and compress the first terminal 308 of the battery compartment 132 in order to electrically connect the second adapter terminal 226 to the first terminal 308. Further, in the second position "P2" of the adapter 154, a retaining portion (not shown) of the third adapter terminal 228 is adapted to contact and compress the first terminal 136 of the battery compartment 132 in order to electrically connect the third adapter terminal 228 to the first terminal 136.

The adapter 154 includes a number of openings, such as a first opening 250, a second opening 252, and a third opening 254. The first opening 250 is disposed on the end 232 of the second section 204 and in association with the first receiving portion 206. The first opening 250 is adapted to allow extension of the second portion 316 of the first battery 302 therethrough in order to connect with the second terminal 138 of the battery compartment 132. The second opening 252 is disposed on the end 230 of the first section 202 and in association with the second receiving portion 208. The second opening 252 is adapted to allow extension of the second portion 318 of the first battery 304 therethrough in order to connect with the second terminal 140 of the battery compartment 132. The third opening 254 is disposed on the end 232 of the second section 204 and in association with the third receiving portion 210. The third opening 254 is adapted to allow extension of the second portion 320 of the first battery 306 in order to connect with the second terminal 142 of the battery compartment 132.

Figure 3D:
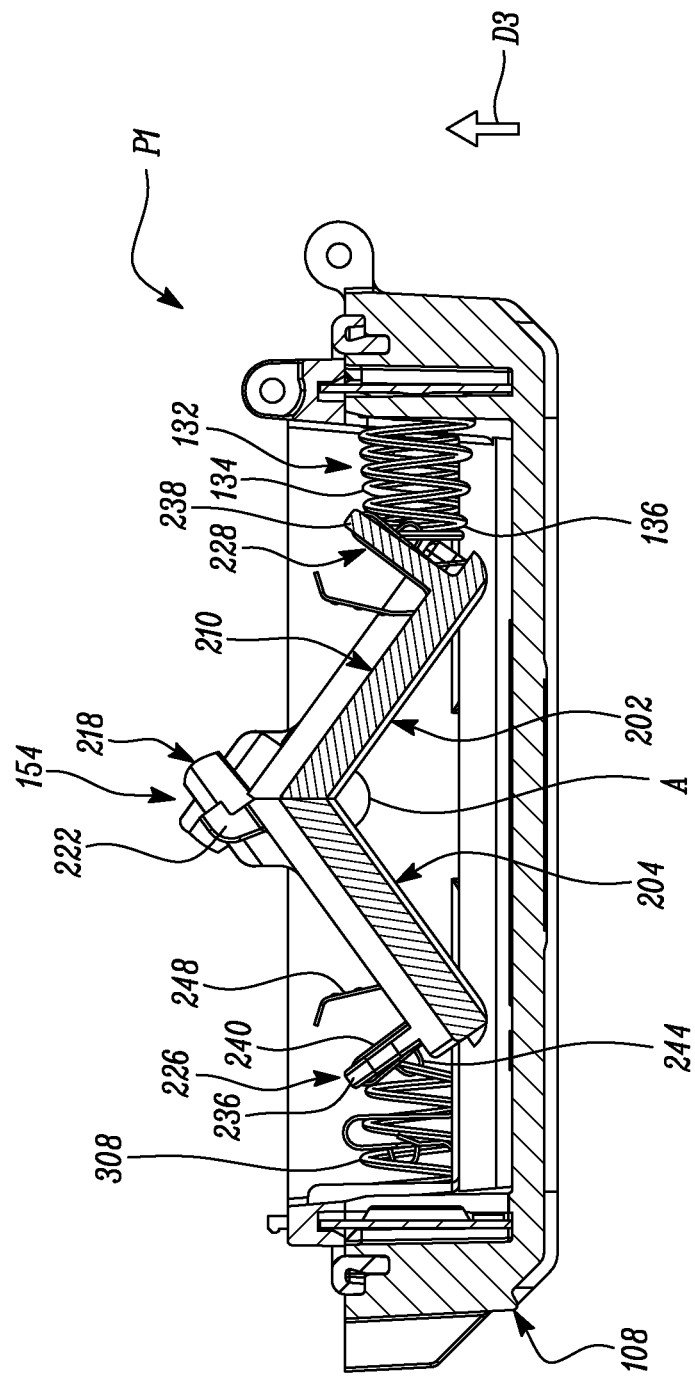
FIG. 3D is a cross sectional view of FIG. 3C along a section S-S', according to one embodiment of the present disclosure.

Referring to FIGS. 3A to 3F, different views of the battery compartment 132 and the adapter 154 are illustrated. Referring to FIG. 4, a flowchart of a method 400 of assembling the adapter 154 in the battery compartment 132 is illustrated. The method 400 will now be explained with combined reference to FIGS. 3A to 3F and FIG. 4. Referring to FIG. 3A, the battery compartment 132 is shown without the adapter 154. As such, the battery compartment 132 receives one or more second batteries 332, 334, 336 in order to power the device 102. Alternatively, the battery compartment 132 may receive the adapter 154 in order to power the device 102 using the plurality of first batteries 302, 304, 306. Accordingly, as shown in FIG. 3B, the battery compartment 132 is shown without the second batteries 332, 334, 336 in order to receive the adapter 154. At step 402, and as shown in FIGS. 3C and 3D, the adapter 154 is articulated to the first position "P1" using the articulating joint 212. More specifically, the first section 202 and/or the second section 204 is articulated about the articulating joint 212 and the articulating axis A-A' in a direction "D3" in order to move the adapter 154 into the first position "P1". At step 404, and as shown in FIGS. 3C and 3D, the adapter 154 is aligned in the battery compartment 132. More specifically, the first section 202 of the adapter 154 is disposed adjacent to the first terminals 134, 136 of the battery compartment 132 and the second section 204 of the adapter 154 is disposed adjacent to the second terminals 138, 142 of the battery compartment 132. As such, the first adapter terminal 224 and the third adapter terminal 228 are aligned and disposed adjacent to the first terminal 134 and the first terminal 136 of the battery compartment 132, respectively. Also, the second adapter terminal 226 is aligned and disposed adjacent to the first terminal 308 of the battery compartment 132.

Figure 3E:
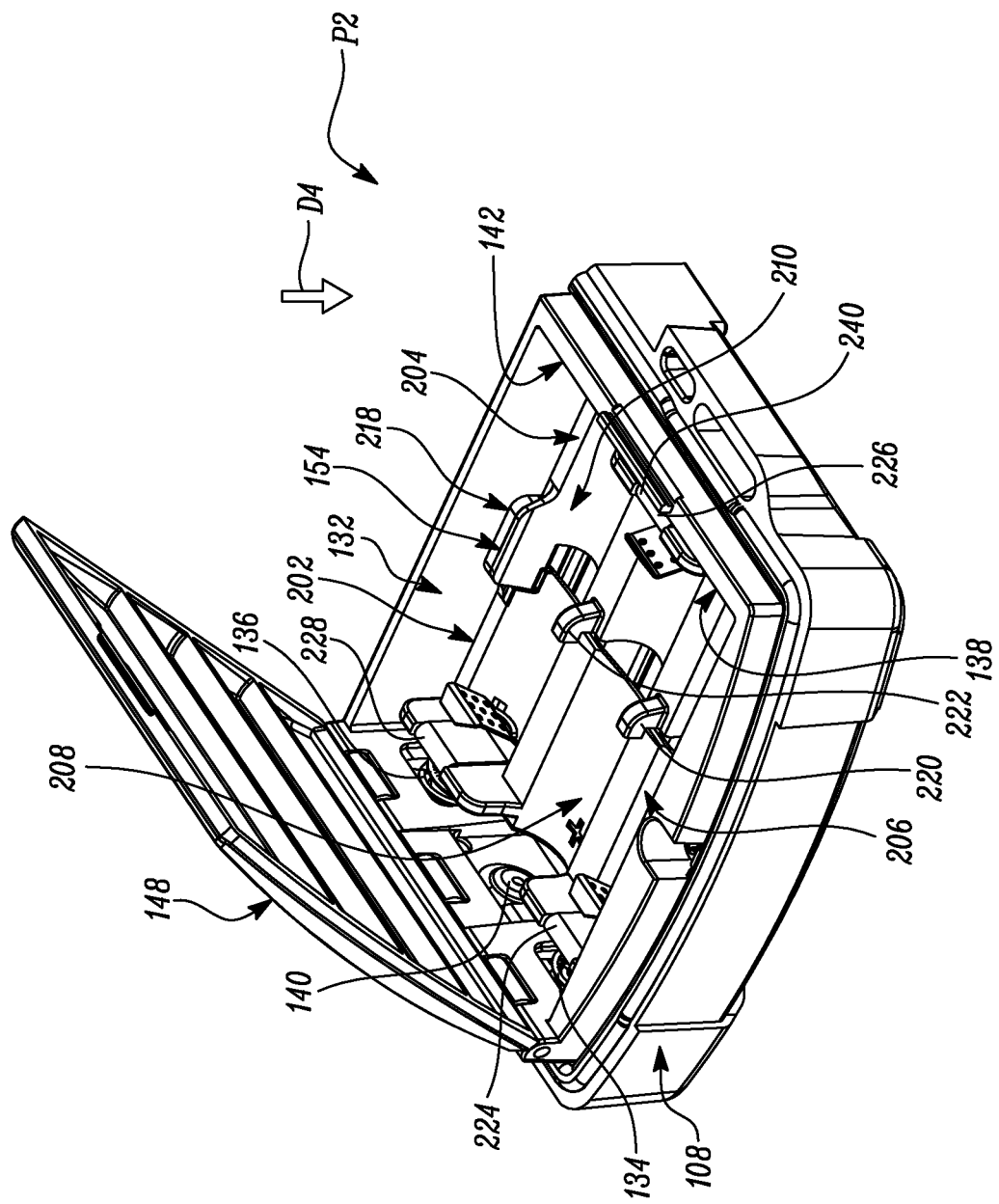
FIG. 3E is a perspective view showing the adapter of FIG. 2 assembled in the battery compartment of FIG. 3B, according to one embodiment of the present disclosure.

At step 406, and as shown in FIG. 3E, the adapter 154 is articulated to the second position "P2" using the articulating joint 212. More specifically, the first section 202 and/or the second section 204 is articulated about the articulating joint 212 in a direction "D4" in order to move the adapter 154 from the first position "P1" to the second position "P2". Accordingly, the at least one adapter terminal is connected to the first terminal 134, 308, 136 of the battery compartment 132, respectively. More specifically, the retaining portion of the first adapter terminal 224 compresses the first terminal 134 and connects the first adapter terminal 224 to the first terminal 134 of the battery compartment 132. Also, the retaining portion 240 of the second adapter terminal 226 compresses the first terminal 308 and connects the second adapter terminal 226 to the first terminal 308 of the battery compartment 132. Further, the retaining portion of the third adapter terminal 228 compresses the first terminal 136 and connects the third adapter terminal 228 to the first terminal 136 of the battery compartment 132.

At step 408, and as shown in FIG. 3E, the adapter 154 is removably secured in the battery compartment 132. More specifically, the locking member 218 disposed in association with each of the first section 202 and the second section 204 is removably engaged in order to removably secure the adapter 154 in the battery compartment 132. As such, in some situations, based on an engagement of the locking member 218, a tactile feedback may be provided to the user, in turn, providing an indication to the user of securing of the adapter 154 in the second position "P2".

Figure 3F:
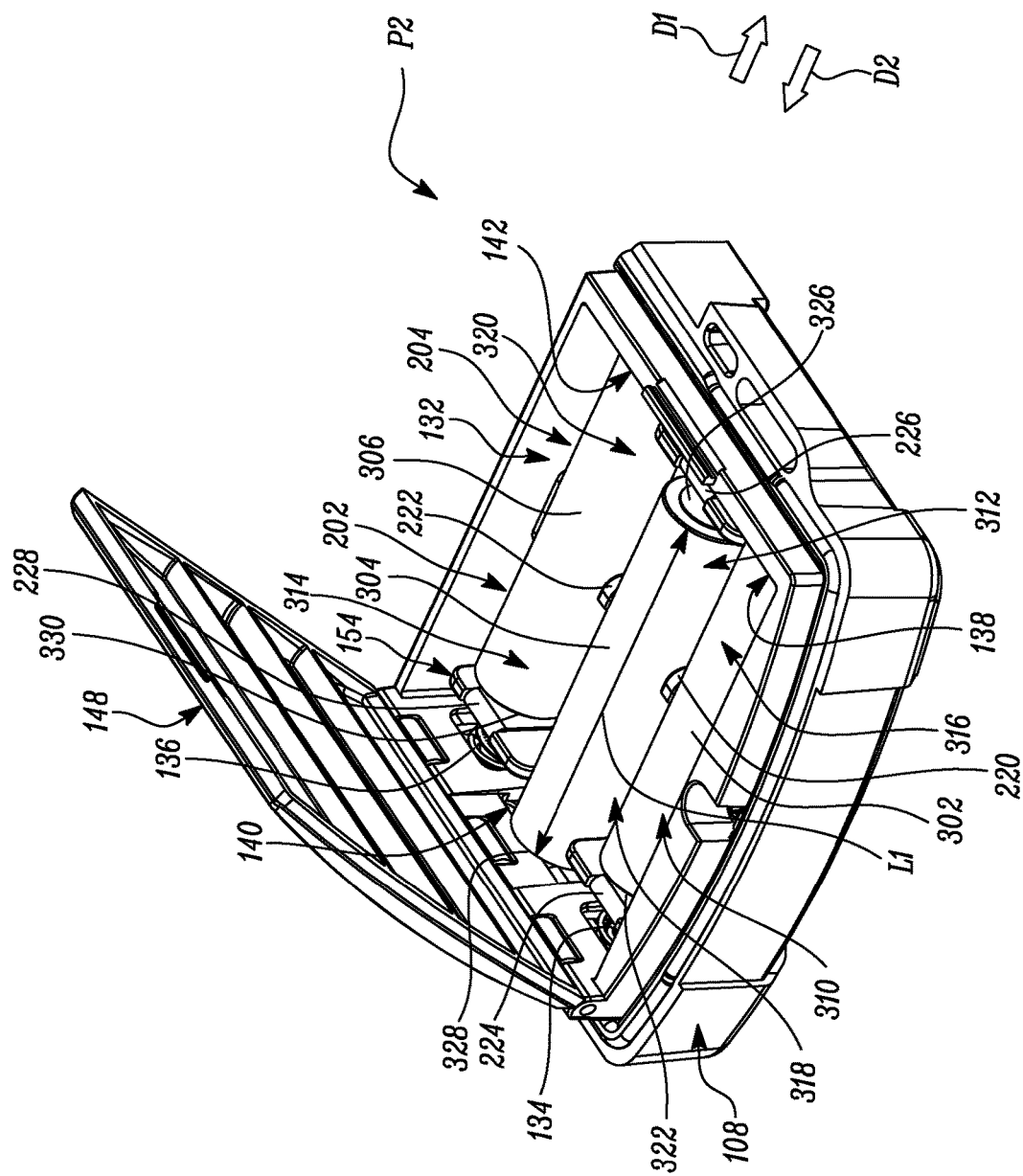
FIG. 3F is a perspective view showing a number of first batteries received in the adapter of FIG. 3E, according to one embodiment of the present disclosure.

At step 410, and as shown in FIG. 3F, the at least one first battery 302, 304, 306 is removably received in the at least one receiving portion of the adapter 154. More specifically, the first battery 302 is removably received in the first receiving portion 206 such that a negative terminal 322 of the first battery 302 connects to the first terminal 134 of the battery compartment 132 and a positive terminal (not shown) of the first battery 302 connects to the second terminal 138 of the battery compartment 132. Also, the first battery 304 is removably received in the second receiving portion 208 such that the negative terminal 326 of the first battery 304 connects to the first terminal 308 of the battery compartment 132 and a positive terminal 328 of the first battery 304 contacts the second terminal 140 of the battery compartment 132. Further, the first battery 306 is removably received in the third receiving portion 210 such that a negative terminal 330 of the first battery 306 contacts the first terminal 136 of the battery compartment 132 and a positive terminal (not shown) of the first battery 306 connects to the second terminal 142 of the battery compartment 132.

Figure 5:
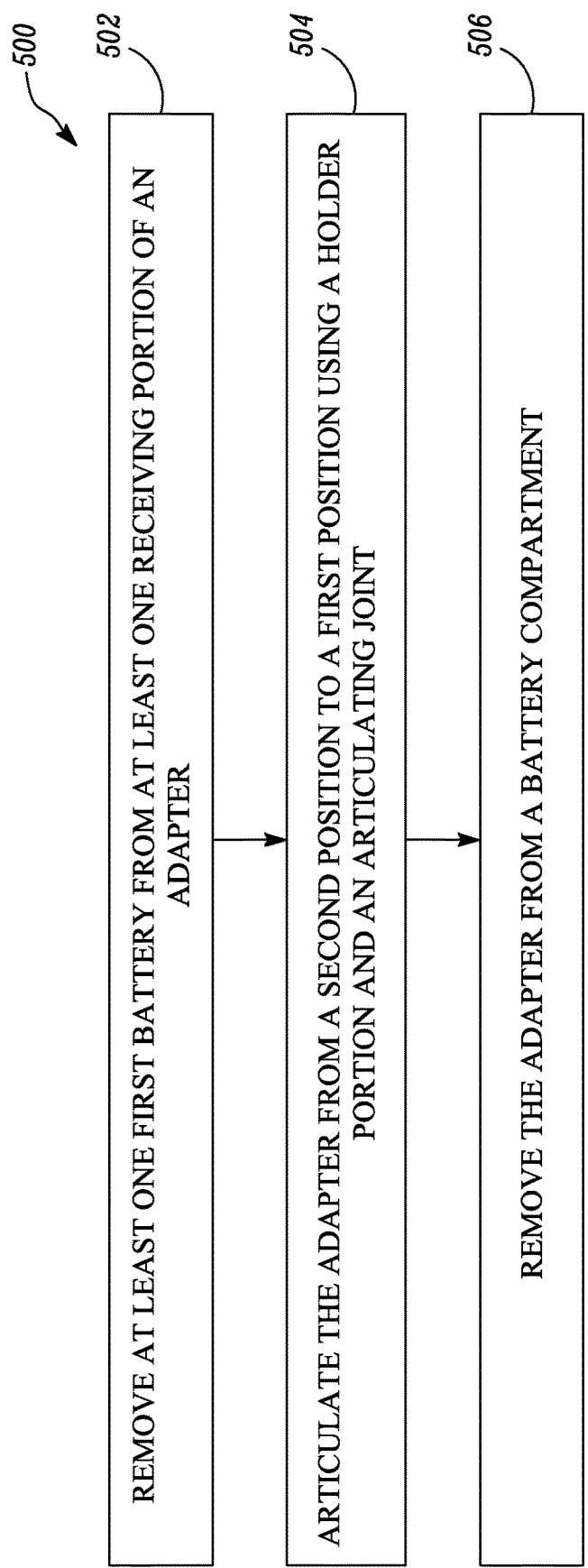
FIG. 5 is a flowchart of a method of disassembling the adapter of FIG. 2 from the battery compartment of FIG. 3F, according to one embodiment of the present disclosure.

Referring to FIG. 5, a flowchart of a method 500 of disassembling the adapter 154 from the battery compartment 132 is illustrated. At step 502, the at least one first battery 302, 304, 306 is removed from the at least one receiving portion of the adapter 154. More specifically, the first battery 302 is removed from the first receiving portion 206 of the adapter 154. Also, the first battery 304 is removed from the second receiving portion 208 of the adapter 154. Further, the first battery 306 is removed from the third receiving portion 210 of the adapter 154. At step 504, the adapter 154 is articulated from the second position "P2" to the first position "P1" using the articulating joint 212, the first holder portion 220, and/or the second holder portion 222. More specifically, the first section 202 and/or the second section 204 is articulated about the articulating joint 212 in the direction "D3" (shown in FIGS. 3C and 3D) in order to move the adapter 154 from the second position "P2" to the first position "P1". As such, in some situations, a tool (not shown) may be engaged with the first holder portion 220 and/or the second holder portion 222 in order to articulate the adapter 154 from the second position "P2" to the first position "P1".

Accordingly, based on the articulation of the first section 202 and/or the second section 204 about the articulating joint 212 in the direction "D3", the locking member 218 may disengage in order to allow movement of the adapter 154 from the second position "P2" to the first position "P1". In some situations, based on the disengagement of the locking member 218, a tactile feedback may be provided to the user, in turn, providing an indication to the user of releasing of the adapter 154 from the second position "P2". Additionally, based on the articulation of the adapter 154 from the second position "P2" to the first position "P1", the at least one adapter terminal is disconnected from the first terminal 134, 308, 136 of the battery compartment 132, respectively. More specifically, the first adapter terminal 224 is disconnected from the first terminal 134 of the battery compartment 132. Also, the second adapter terminal 226 is disconnected from the first terminal 308 of the battery compartment 132. Further, the third adapter terminal 228 is disconnected from the first terminal 136 of the battery compartment 132. At step 506, the adapter 154 is removed from the battery compartment 132. In such a situation, the battery compartment 132 may receive the one or more second batteries 332, 334, 336 in order to power the device 102.

The adapter 154 provides a simple, efficient, and cost-effective method of using one or more first batteries 302, 304, 306 having the length "L1" substantially different from the length "L2" of the one or more second batteries 332, 334, 336 adapted to be received in the battery compartment 132 without the adapter 154. As such, the adapter 154 provides use of differently sized batteries in order to power the device 102, in turn, improving usability and flexibility of the device 102. Also, the adapter 154 has a simple articulating configuration, in turn, providing ease of assembly/disassembly of the adapter 154 relative to the battery compartment 132. Additionally, the locking member 218 of the adapter 154 limits accidental removal of the adapter 154 from the battery compartment 132, in turn, improving usability. The adapter 154 includes an overall articulating range from approximately 10° to 180°, in turn, limiting an overall footprint of the adapter 154 during storage and improving portability. The adapter 154 may be retrofitted in any battery compartment with little or no modification to an existing device configuration, in turn, improving flexibility and compatibility.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An adapter for use with a battery compartment of an electronic device, the adapter comprising:
 a first section adapted to receive a first portion of at least one first battery;
 a second section disposed adjacent to the first section, the second section adapted to receive a second portion of the at least one first battery; and
 an articulating joint disposed between the first section and the second section, the articulating joint being adapted to selectively articulate the first section relative to the second section to move the adapter between a first position and a second position,
 wherein, in the first position, the adapter is adapted to be aligned in the battery compartment, and
 wherein, in the second position, the adapter is adapted to be removably secured in the battery compartment.

2. The adapter of claim 1, wherein, in the first position, the first section is inclined relative to the second section.

3. The adapter of claim 1, wherein, in the second position, the first section is substantially parallel to the second section.

4. The adapter of claim 1, wherein, in the second position, an angle between the first section and the second section is about 180 degrees.

5. The adapter of claim 1, wherein at least one of the first section and the second section includes at least one adapter terminal, wherein the at least one adapter terminal is adapted to be electrically connected to a first terminal of the battery compartment in the second position of the adapter.

6. The adapter of claim 1 further includes a locking member disposed in association with each of the first section and the second section, the locking member adapted to removably secure the adapter in the second position.

7. The adapter of claim 1, wherein the articulating joint is a pin joint.

8. The adapter of claim 1 further includes at least one holder portion disposed on at least one of the first section and the second section.

9. The adapter of claim 1, wherein the battery compartment is adapted to receive at least one second battery having a second length, and wherein the adapter is adapted to receive the at least one first battery having a first length smaller than the second length.

10. An electronic device selectively powered by one of at least one first battery and at least one second battery, the electronic device comprising:
 a battery compartment adapted to selectively receive the at least one second battery; and
 an adapter adapted to be removably received in the battery compartment, the adapter adapted to selectively receive the at least one first battery, the adapter including:
 a first section adapted to receive a first portion of the at least one first battery;
 a second section disposed adjacent to the first section, the second section adapted to receive a second portion of the at least one first battery; and
 an articulating joint disposed between the first section and the second section, the articulating joint adapted to selectively articulate the first section relative to the second section to move the adapter between a first position and a second position,
 wherein, in the first position, the adapter is adapted to be aligned in the battery compartment, and
 wherein, in the second position, the adapter is adapted to be removably secured in the battery compartment.

11. The electronic device of claim 10, wherein, in the second position, the first section is substantially parallel to the second section.

12. The electronic device of claim 10, wherein, in the second position, an angle between the first section and the second section is about 180 degrees.

13. The electronic device of claim 10, wherein at least one of the first section and the second section includes at least one adapter terminal, wherein the at least one adapter terminal is adapted to be electrically connected to a first terminal of the battery compartment in the second position of the adapter.

14. The electronic device of claim 10, wherein the adapter further includes a locking member disposed in association with each of the first section and the second section, the locking member adapted to removably secure the adapter in the second position.

15. The electronic device of claim 10, wherein the adapter further includes at least one holder portion disposed on at least one of the first section and the second section.

16. The electronic device of claim 10, wherein the battery compartment is adapted to receive the at least one second battery having a second length, and wherein the adapter is adapted to receive the at least one first battery having a first length smaller than the second length.

17. A method comprising:
  articulating an adapter to a first position, wherein the first position comprises the adapter aligned in a battery compartment, wherein the adapter comprises a first section configured to receive a first portion of a battery, a second section configured to receive a second portion of the battery, and an articulating joint, disposed between the first and second sections, wherein articulating the adapter comprises the articulating joint articulating the adapter to the first position;
  aligning the adapter in the battery compartment, wherein aligning comprises the first section being disposed adjacent to a first terminal of a battery compartment and the second section is disposed adjacent to a second terminal of the battery compartment;
  articulating the adapter to a second position using the articulating joint, wherein, in the second position, the adapter is adapted to be removably secured in the battery compartment;
  securing, removably, the adapter in the battery compartment; and
  receiving, removably, the battery.

18. The method of claim 17, wherein articulating the adapter to the second position further includes connecting the at least one adapter terminal with the first terminal of the battery compartment.

19. The method of claim 17, wherein securing the adapter in the battery compartment further includes removably engaging the locking member disposed in association with each of the first section and the second section.

20. The method of claim 17 further includes:
  removing the battery from the at least one receiving portion of the adapter;
  articulating the adapter from the second position to the first position; and
  removing the adapter from the battery compartment.

* * * * *